United States Patent [19]

Ward

[11] 4,370,547

[45] Jan. 25, 1983

[54] VARIABLE THERMAL IMPEDANCE

[75] Inventor: Curtis E. Ward, Los Altos, Calif.

[73] Assignee: Varian Associates, Inc., Palo Alto, Calif.

[21] Appl. No.: 254,811

[22] Filed: Apr. 16, 1981

Related U.S. Application Data

[63] Continuation of Ser. No. 98,012, Nov. 28, 1979, which is a continuation of Ser. No. 901,937, May 1, 1978, abandoned.

[51] Int. Cl.³ .............................................. H05B 1/02
[52] U.S. Cl. ..................................... 219/497; 219/494; 219/312; 165/32; 165/104.26; 165/104.24
[58] Field of Search ............... 219/497, 501, 494, 312, 219/499; 165/32, 96, 105, 104, 104.24, 104.26

[56] References Cited

U.S. PATENT DOCUMENTS

| 3,517,730 | 6/1970 | Wyatt | 219/540 |
| 3,526,272 | 9/1970 | Watts et al. | 219/497 |
| 3,924,674 | 12/1975 | Basiulis | 165/105 |
| 3,934,643 | 1/1976 | Laing | 165/105 |
| 4,067,237 | 1/1978 | Arcella | 165/105 |
| 4,078,149 | 3/1978 | Whirlow et al. | 165/105 |

OTHER PUBLICATIONS

"The Heat Pipe" 2-1967, Mechanical Engineering by Feldman, Jr. et al.

Primary Examiner—M. H. Paschall
Attorney, Agent, or Firm—Stanley Z. Cole; Norman E. Reitz; Keiichi Nishimura

[57] ABSTRACT

The invention is a method for controlling the temperature of a primary heat-generating source in an environment whose temperature may vary widely. A heat-pipe is used to carry the heat from the source to a sink at ambient temperature. A separate control source applies heat to the heat pipe. The condensed liquid returning in the heat pipe is partly evaporated by the control heat, whereby the flow of liquid available for evaporation by the primary heat source is reduced and the heat conducted away from the source by the pipe is consequently reduced. The control source heat is regulated by a servo circuit to maintain the temperature of the primary source. The efficiency is higher than prior-art controllers using a constant thermal impedance between source and sink.

4 Claims, 4 Drawing Figures

VARIABLE THERMAL IMPEDANCE

This is a continuation of application Ser. No. 98,012 filed Nov. 28, 1979 which is a continuation of Ser. No. 901,937 filed May 1, 1978 now abandoned.

FIELD OF THE INVENTION

The invention pertains to temperature regulation by servo controls. It is often necessary to maintain a critical part of an apparatus at constant temperature while the surrounding environment may vary through a wide range of temperatures. For example, radio-frequency oscillators whose frequency is a function of temperature must often be stabilized by maintaining the frequency-determining elements at constant temperature.

PRIOR ART

The common way to regulate the temperature of an element has been to heat it above the highest expected ambient temperature with an auxilliary heater. The power of the auxilliary heater is regulated by a servo circuit which senses the temperature of the controlled element, compares the sensing signal to a preset standard, and amplifies the difference to regulate the auxilliary heater. This prior-art apparatus is wasteful of power, as will be shown later in connection with FIG. 1.

Heat-pipes have been used to conduct a controlled flow of heat to regulate the temperature of an element being cooled. These prior-art controls involve a filling of an inert "buffer" gas in the heat-pipe, which increases its cost and complexity and makes the heat-pipe useful for only a specific temperature as determined by its vaporizable fluid and the buffer gas. In the present invention, on the other hand, a standard heat-pipe can be used over a considerable range of selected temperatures.

SUMMARY OF THE INVENTION

An object of the invention is to provide a thermal regulator with improved efficiency.

Another object is to provide regulated temperature only slightly above the highest ambient temperature.

A further object is to regulate the temperature of a heat-generating source with a minimum of added power.

A further object is to provide a stable oscillator via temperature regulation.

These objects are achieved by a regulating apparatus comprising a heat pipe connecting the element to be regulated with a heat sink at a variable temperature, such as the ambient. A controlled heat source applied to the heat pipe is energized by a servo circuit to evaporate some of the returning liquid in the heat pipe. The amount of liquid returning to cool the element being regulated is thereby controlled, thus the amount of heat removed from the source element.

DETAILED-DESCRIPTION OF THE PREFERRED EMBODIMENTS

Figure 1:
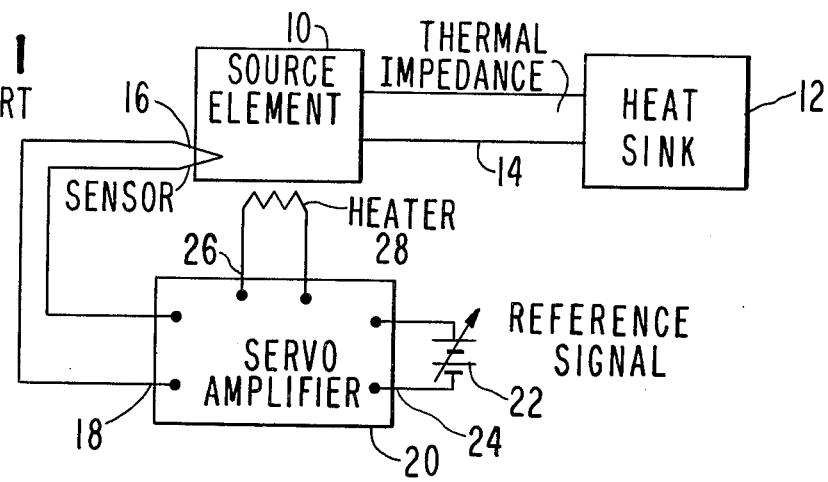
FIG. 1 is a diagram of a prior art temperature control system.

FIG. 1 illustrates the common prior-art temperature regulator for a temperature-sensitive element 10 which is a source of heat, such as for example an electronic oscillator. The resonant elements of such oscillators always change their dimensions to some extent as a function of temperature, thereby altering the frequency of the oscillator. By stabilizing the temperature, the frequency is made much more stable as the ambient temperature varies through wide ranges.

In the prior art source element 10 was connected to a heat sink 12 which was at ambient temperature or at least at a temperature which followed the ambient. A thermal impedance 14 connected source 10 to sink 12. Impedance 14 could be a metallic conductor, an insulator, or sometimes just the surrouding atmosphere. In any case, the thermal impedance is generally constant, that is the temperature drop is generally proportional to the flow of heat. The value of the thermal impedance can usually be chosen as desired to optimize the operation over a required range of ambient temperature.

A heat sensor 16 such as a thermocouple, generates a signal such as a DC voltage, indicating the temperature of source element 10. This temperature signal is applied to the signal input 18 of a servo amplifier 20, where it is compared to a preset signal from a reference source 22 which is fed to the reference input 24 of servo amplifier 20. The two input signals are compared and their difference amplified to generate power at the output terminals 26 of amplifier 20, the amplification being in a sense such that an increase in the temperature-indicative input signal 18 produces a decrease in output power. This electric power is fed to a heater 28 which supplies controlled heat to source element 10.

There is inherent inefficiency in this prior art control system, as illustrated by mathematical analysis of its requirements. Let $T_1$ and $T_2$ be the lower and higher limits of the ambient temperature range of sink 12. Let Po be the waste heat generated by source 10, To the temperature at which source element 10 is to be regulated, and R the value of thermal impedance 14. At the highest ambient $T_2$, the total heat flowing through impedance 14 is $(To-T_2)/R$ and the heat supplied by servo 20 must be $P_2=(To-T_2)/R-Po$. Obviously this minimum control power should be 0 for maximum efficiency, so that $To=T_2+R\, Po$.

At the lowest ambient temperature $T_1$, the heat supplied by servo 20 is $P_1=(To-T_1)/R-Po$ and putting in the value of To from the preceding equation $P_1=(T_2-T_1)/R-Po$.

It is obvious that to reduce the maximum power $P_1$ supplied by servo 20 we should have a high impedance R. However, this will increase the operating temperature To of source element 10. In many cases the maximum allowable value of To is not much above the maximum ambient $T_2$, so R must be chosen accordingly $$R=(To-T_2)/Po$$

For example, an oscillator producing 10 W of waste power required to operate in an ambient range of $-54°$ C. to $+75°$ C. has a maximum permissable operating temperature of 85° C. Thus, $$R=(85-75)°\,C./10\,W=1.0°\,C./W$$

and $$P_1 = (75-54)° C./1.0° C./W - 10 W = 129 W - 10 W = 119 W$$

It is obviously inefficient to use 119 W of control power to stabilize a 10 W oscillator.

Figure 2:
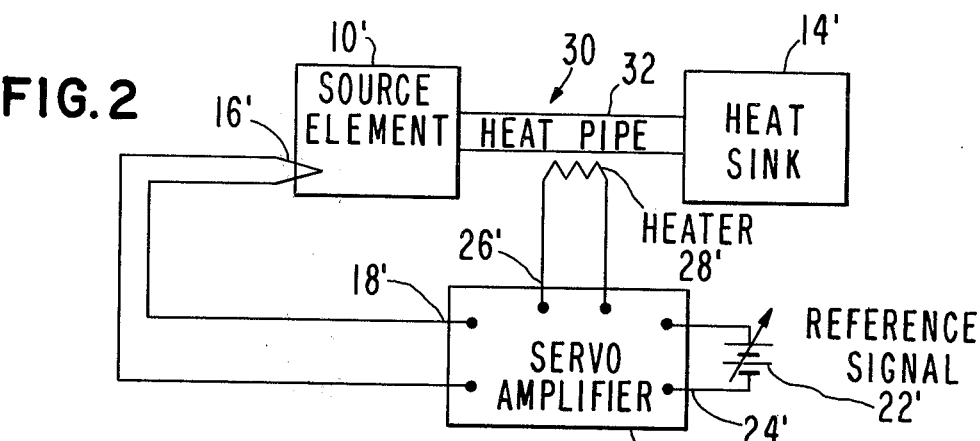
FIG. 2 is a schematic diagram of a temperature control system embodying the invention.

FIG. 2 is a schematic diagram of a temperature controller embodying the invention. All the elements are identical to the prior-art controller of FIG. 1 except that the thermal impedance 14 of FIG. 1 is replaced by a heat pipe 30. In the embodiment shown in FIG. 2, the heat from the control heater 28' is applied to heat pipe 30 at a point 32 intermediate source element 10' and sink 14'. This is a very convenient and efficient way to apply the control, and the response is fast because the heat capacity of the pipe itself is quite low. The fast response makes the servo loop relatively easy to stabilize. However, the control heat may be applied at any region of the pipe, or even to the source element itself, in which latter case the schematic diagram of the apparatus is identical with FIG. 1 except that thermal impedance 14 is replaced by heat pipe 30.

Figure 3:
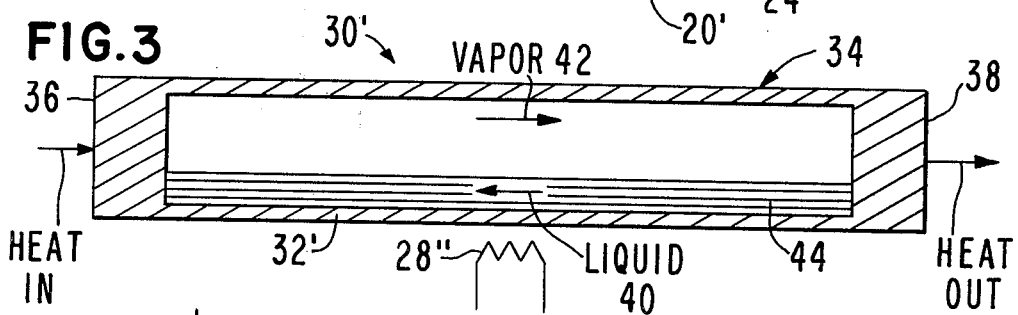
FIG. 3 is a sketch of a heat pipe.

FIG. 3 shows diagrammatically the construction of heat pipe 30. Complete description of heat pipes can be found e.g. in the book "Heat Pipes" by P. D. Dunn and D. A. Reay, Pergammum Press 1976. Briefly, heat pipe 30' consist of an elongated hollow tube 34, as of stainless steel, closed at both ends. One end 36 is designed to receive incoming heat as from source element 10' and the other end 38 is designed to transmit heat out to a sink such as sink 14'. The heat is carried down pipe 30' by boiling a vaporizable liquid 40 at input end 36, thereby absorbing its heat of vaporization. The vapor 42 flows down pipe 30' and condenses at output end 38, releasing the heat of vaporization. The condensed liquid 40 returns to input 36 by capillary flow through a wick 44 extending throughout the length of tube 34. Wick 44 may be e.g. a bundle of strads of fine stainless steel wire or a porous material bonded to the inside of tube 34.

In the use of the invention, control heat from heater 28" is applied at region 32' of pipe 30'. Returning liquid 40 is partially vaporized at 32' so the quantity of liquid remaining to flow back to heat source 36 is reduced. When this return flow to the source is less than that required to remove the source power by heat of vaporization, the temperature of the source must rise because the thermal conductivity of pipe 34 and vapor 32 is quite small. The rate of heat removal from input 36 is thus controlled by the control heater 28".

Figure 4:
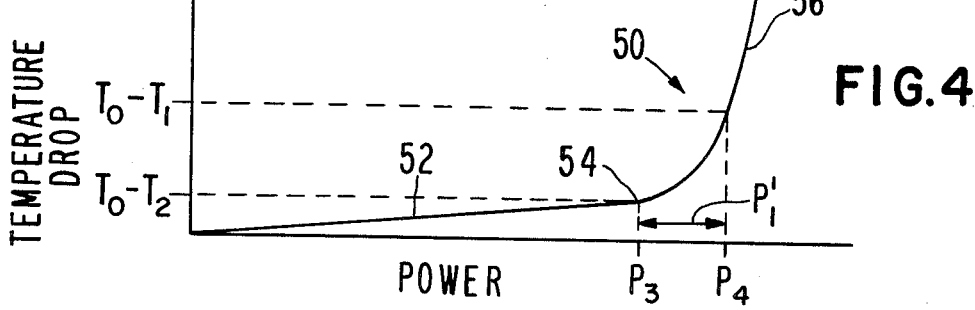
FIG. 4 is a graph of heat pipe characteristics.

The efficiency of the inventive control apparatus can be much higher than that of the prior-art controller using a constant thermal impedance illustrated by FIG. 1. The reason for the improved efficiency is shown by FIG. 4 which is a schematic graph of a characteristic of a heat pipe. Temperature drop between the input and output ends is plotted against the power transferred as a curve 50. For low values of power, the drop is quite small and roughly proportional to the power, as represented by the straight-line portion 52 of curve 50. When the power is raised to a value P, corresponding to point 54 on curve 50, all the available return flow of liquid is vaporized as fast as it gets to input end 36 (FIG. 3). Any further increase of power rapidly raises the temperature drop following a steep position 56, of curve 50 because the added power can be carried only by conduction in the solid pipe 34 and convection of the vapor 42.

If now the heat pipe is designed such that the knee 54 of curve 50 corresponds approximately to the power Po of the source element 10' ($P_3 = Po$), then the temperature drop in pipe 30 will be a small value $To - T_2$ when the ambient temperature is at its highest value $T_2$ and zero control power is added. As the ambient temperature decreases to its lowest value $T_1$, control power $P_1' = P_4 - P_3$ must be added. However, due to the highly non-linear characteristic of the pipe, control power $P_1'$ can be low compared to source element power Po instead of many times Po as in the prior-art example above. In stabilizing the source of that example, control power of 20 W could be used instead of the prior art 119 W.

Of course it is not necessary that the "bias" point of zero control power be exactly at the knee 54 of curve 50. Also the knee is not really a sharply defined point. To allow for possible variations in the pipe with manufacturing tolerances and with age, the bias power may be considerably below knee 54.

The use of the invention only requires that a portion of the required range of temperature drops contains a portion of the non-linear characteristic.

Many different embodiments of the invention will be obvious to those skilled in the art. The invention is intended to be limited only by the following claims and their legal equivalence.

I claim:

1. A method of regulating the temperature of a heat source element which can be operated in a mode wherein heat is generated, comprising the steps of:
   operating said element in said mode;
   establishing a thermal connection via a heat pipe between said element and a heat sink for removing heat from said element, the relationship of the temperature difference between the ends of said heat pipe to the power-transfer through said heat pipe exhibiting a significantly more strongly non-linear characteristic in a high-power transfer region than in the lower power-transfer regions;
   supplying heat from a control heater to said heat pipe in real time servo response to the temperature of said element; and
   operating said heat pipe in a temperature gradient region which includes at least a portion of said high power-transfer region, the power level of said element being approximately within said high power-transfer region.

2. The method of claim 1 wherein said step of supplying heat to said heat pipe is accomplished by the step of applying said heat to said heat pipe at a region intermediate said element and said heat sink.

3. The method of claim 1 wherein said step of supplying heat to said heat pipe is accomplished by the step of applying said heat to the end of said heat pipe adjacent said element.

4. The method of claim 1 wherein said heat pipe contains a liquid therein, all of said liquid flowing toward said element being vaporized as soon as or before reaching the end of said heat pipe connected to said element when said apparatus is replaced by said heat pipe.

* * * * *